United States Patent [19]
Craig

[11] 3,850,419
[45] Nov. 26, 1974

[54] TRACTOR SPLITTER

[76] Inventor: Gerald Craig, 351 Marlbourough St., Brantford, Ontario, Canada

[22] Filed: Apr. 5, 1973

[21] Appl. No.: 347,995

[52] U.S. Cl................ 269/17, 254/2 B, 254/134, 280/47.15
[51] Int. Cl............. B66f 5/04, B66f 7/28
[58] Field of Search...... 214/1 D; 248/352; 254/2 B, 254/6 B, 7 B, 8 B, 9 B, 10 B; 269/17; 280/47.15, 150.5, 475

[56] References Cited
UNITED STATES PATENTS

| | | | |
|---|---|---|---|
| 1,211,373 | 1/1917 | Weaver | 254/7 B |
| 1,241,418 | 9/1917 | Mosher | 280/47.15 |
| 1,611,366 | 12/1926 | Peterson et al. | 254/8 B X |
| 2,058,691 | 10/1936 | Holsten et al. | 280/47.15 X |
| 2,904,308 | 9/1959 | Vergara | 269/17 X |
| 3,433,447 | 3/1969 | Carroll | 248/352 |

Primary Examiner—Roy Lake
Assistant Examiner—Neil Abrams
Attorney, Agent, or Firm—Ridout & Maybee

[57] ABSTRACT

For supporting a tractor when it is split at its midsection, a first jack having at least a tricycle-wheeled base is provided with a vertically adjustable support that can be elevated by the jack to take the weight of the forward part of said midsection, and a similar, second jack can take the weight of the rearward part of said midsection. To ensure that the first jack will roll stably with the front wheels of the tractor, the base of the jack is connected, through a hinge having a horizontal axis, to a forwardly extending arm along which a transverse yoke is adjustably positioned, the yoke carrying at opposite sides of the arm a pair of uprights that are adjustably positioned along the yoke and are connectable at their upper ends to the frame of the tractor between its front wheels. To ensure similar stability of the second jack, its base is connected, through a hinge having a horizontal axis, to a rearwardly extending arm along which a coupler is adjustably positioned, the coupler extending upwardly for connection to the tractor drawbar.

12 Claims, 4 Drawing Figures

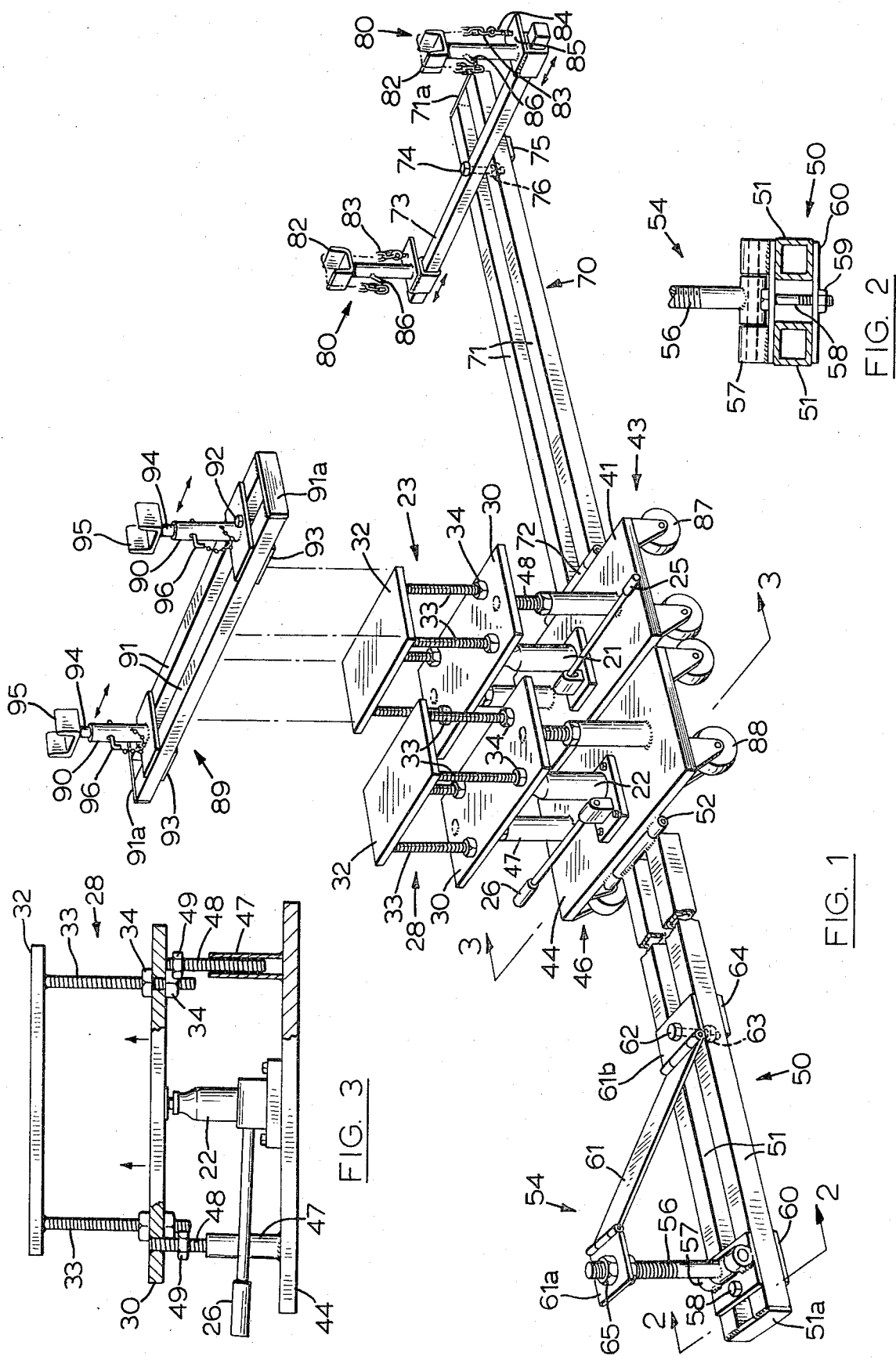

TRACTOR SPLITTER

BACKGROUND OF THE INVENTION

1. Field of the Invention

This invention relates to apparatus for supporting a tractor when split at its midsection.

2. Description of the Prior Art

When it is desired to make repairs or do maintenance work on a farm tractor, and particularly to work on the clutch and transmission, it may be necessary to split the tractor at its midsection. The front tractor wheels will partially support the forward part of the tractor but it is necessary to provide additional support rearwardly of the front wheels, and similarly the rear tractor wheels will partially support the rearward part of the tractor but additional support is needed ahead of the rear wheels. Various makeshift means have been used to provide the additional supports but such means have tended to be cumbersome or unsafe or unsuited to accommodate different makes of tractor.

SUMMARY OF THE INVENTION

The present invention provides stable and convenient means for supporting a tractor when it is being split, while it is split and being worked upon, and during its reassembly. The forward part of the midsection of the tractor is supported by a first jack, and the rearward part of the midsection by a second jack. The first jack is mounted on wheels and connected to a front part of the tractor in such a way as to ensure that it stably rolls with the front wheels of the tractor, and the second jack is also mounted on wheels and connected to a rear part of the tractor in such a way as to ensure that it stably rolls with the rear wheels of the tractor.

BRIEF DESCRIPTION OF THE DRAWINGS

A preferred embodiment of the invention is illustrated by way of example in the accompanying drawings in which:

FIG. 1 is a perspective view of a tractor splitter, with a supplemental yoke shown raised above the splitter;

FIG. 2 is a transverse sectional view taken along the line 2—2 of FIG. 1;

FIG. 3 is a transverse sectional view taken along the line 3—3 of FIG. 1, with parts broken away.

DESCRIPTION OF THE PREFERRED EMBODIMENT

Figure 4:
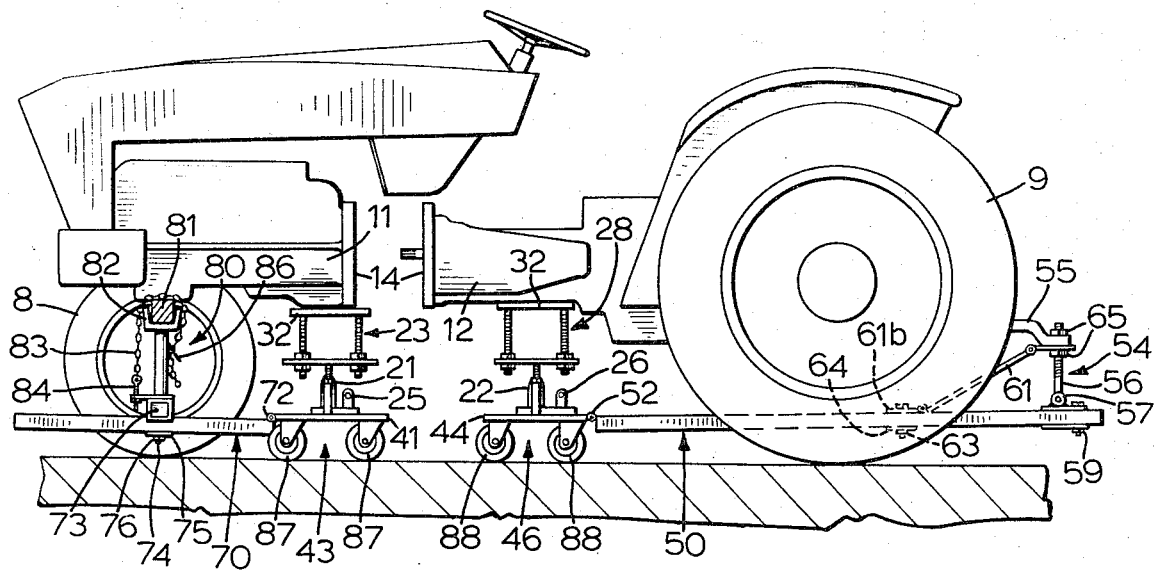
FIG. 4 is a side elevation of a split tractor (simplified for ease of illustration) supported by the splitter of FIG. 1, parts of the front undercarriage of the tractor being broken away.

Referring to FIG. 4, the tractor illustrated has a pair of front wheels 8 (one of which has been removed for clarity of illustration) and rear wheels 9, and has been split at its midsection, the forward part of the midsection being designated by numeral 11 and the rearward part of the midsection by numeral 12. For simplicity of illustration, a simple split along flanges 14 is shown, but it may of course be necessary also to disconnect steering linkages and other parts of the tractor.

Under the forward part 11 of the tractor midsection is a first hydraulic jack 21, and under the rearward part 12 is a second hydraulic jack 22. The head of the first jack is connected to a support generally indicated by numeral 23, and the jack can be operated, by pumping its handle 25, to elevate the support 23 so that the latter takes the weight of the part 11 of the tractor. Similarly the second jack 22 can be operated by pumping its handle 26 to elevate a support 28 which can take the weight of the part 12 of the tractor. To lower the supports 23, 28, the jacks have the usual valves (not shown) which when opened allow their pistons to sink.

As best seen in FIGS. 2 and 3, each support 23, 28 consists of a pair of spaced apart horizontal plates 30, 32, the lower plate 30 being fastened to the head of a jack, and the upper plate 32 having four studs 33 welded to it and extending downwardly through holes in the lower plate. The height of the support can be adjusted by the adjustment of nuts 34 on the studs. This adjustment enables the operator to vary the elevation of the upper plate to suit tractors of different makes, the midsections of which may be at different elevations varying so greatly that the stroke of the jacks cannot accommodate all of them.

A base for the jack 21 is provided by the platform 41 of a wheeled dolly 43, and similarly a base for the jack 22 is provided by the platform 44 of a wheeled dolly 46. Vertical guide cylinders 47 extend upwardly from these bases of the jacks, and vertical guide studs 48 extend downwardly from the lower plates 30 of the supports into the cylinders 47 and restrain the supports against other than vertical movement as they are elevated and lowered. Nuts 49 (FIG. 3) on the studs 48 can be turned down against the upper ends of the cylinders 47 when the jack has been raised, as a safety feature.

Extending rearwardly from the dolly 46 is an arm 50 which, as best seen in FIG. 2, consists of two parallel box sections 51. The arm 50 is connected to the base of the jack 22 by a hinge 52 having a horizontal axis. At the other end of the arm 50 a plate 51a unites the two box sections. Near this end the arm 50 carries a coupler 54 which extends upwardly from the arm and is connectable to the drawbar 55 of the tractor, as shown in FIG. 1. One part of the coupler 54 is a stud 56 having a T-shaped end that is hinged to the arm 50 by being journalled in a bearing 57. As can be seen in FIG. 2, a bolt 58 extends downwardly from the bearing 57, between the box sections 51, and a nut 59 can be tightened on the bolt to clamp the bearing 57 and a lower plate 60 against the upper and lower sides of the arm 50. At its upper end the T-shaped stud 56 passes through the hinged end 61a of an inclined brace 61, the opposite hinged end 61b of which is clamped to the arm 50 by a bolt 62, nut 63 (FIG. 1) and plate 64 in the same way as the bearing 57 is clamped to the arm 50. By loosening the nuts 59, 63 it is possible to slide the coupler 54 along the arm 50 to adjust the position of the coupler to suit the locations of the drawbars 55 of different tractors. To suit different drawbars it is also possible to vary the angle of the stud 56, relative to the arm 50, by adjusting the spacing between the bearing 57 and the end 61b of the brace. The coupler can be connected to a drawbar by nuts 65 threaded onto the stud 56.

From the dolly 43 there extends forwardly an arm 70 which, like arm 50 consists of two parallel box sections 71. The arm 70 is connected to the base of the jack 21 by a hinge 72 having a horizontal axis. At the other end of the arm 70 the box sections 71 are connected by a plate 71a. Extending transversely to the arm 70 is a horizontal yoke 73. The yoke 73 is clamped to the arm 70 by a bolt 74, plate 75 and nut 76 similar to the bolt 58, plate 60 and nut 59 of FIG. 2. When the nut 76 is loosened the position of the yoke 73 along the arm can be adjusted to locate the yoke under the part of the tractor to which connections are to be made. Such connections are made by means of uprights 80 that are slidable on the yoke 73 at opposite sides of the arm 70. The uprights are adjusted in position along the yoke to locate the upper ends of the uprights where they can be connected to the frame 81 of the tractor. These connections to the tractor are made at the front part thereof, at points transversely spaced apart between the front wheels 8. To make the connections, the uprights are provided with concave channels 82 at their upper ends to engage the tractor frame 81, and flexible chains 83 are looped over the frame to fasten the uprights to the frame. One end of each chain is connected to an eyebolt 84 threaded into a flange 85 at the base of an upright 80, and the chain can be snagged near its other end over a downturned projection 86 on the upright. The chain, looped over the frame 81, can be tightened by screwing down the eyebolt 84.

The supports 23, 28 carry part of the weight of each of the split sections of the tractor, and it is not necessary that they be bolted or otherwise fastened thereto. The dolly 43 is connected to the tractor by the forwardly extending arm 70, the yoke 73, the uprights 80 and the chains 83, and these connecting means ensure that the dolly 43 stably rolls with the front wheels of the tractor. The arm 70 is hinged at 72 to the dolly 43, to facilitate making the connections of the uprights 80 and chains 83 to the tractor frame 81, but forces transmitted to the dolly through the arm 70 are in substantially a horizontal line close to the axes of the dolly's caster wheels 87 and exert but slight toppling moment to the dolly. Similarly, the dolly 46 is connected to the tractor by the rearwardly extending arm 50 and the upwardly extending coupler 54, and these connecting means transmit forces to the dolly along a line close to the axes of the dolly wheels and exert little toppling moment. The dollys illustrated each have four wheels, two at each side, distributed forwardly and rearwardly of the vertical axis of the jack for stability. The dollys should be at least tricycle-wheeled to achieve such stability.

It is a simple matter to adjust the apparatus described above to suit tractors of different sizes. An accessory that is useful for some tractors is the additional yoke 89, with uprights 90, shown in FIG. 1. This accessory can be fastened to the support 23 so as to constitute part thereof. The yoke 89 consists of a pair of parallel box sections 91 connected by end plates 91a. The lower ends of the uprights 90 can be clamped at desired positions along the yoke 89 by bolts 92, nuts (not shown) and plates 93 similar to the bolt 58, nut 59 and plate 60 of FIG. 2. Telescopic within the uprights 90 are posts 94 having concave channels 95 at their upper ends. Removable pins 96 pass through the uprights 90 and the posts 94, the posts 94 having along their length a plurality of pin-receiving holes (not shown) whereby the elevations of the posts in the uprights can be adjusted. The tractor frame can rest in the channels 95, the weight of the forward part of the tractor midsection thus being carried by structurally strong parts of the tractor, in a case where for example the structure indicated by numeral 11 is not designed to carry loads. Other modifications will readily occur to those skilled in the art and are intended to be covered by the subjoined claims.

What I claim as my invention is:

1. Apparatus for supporting a tractor when split at its midsection between its front and rear wheels, comprising a first jack having a wheeled base and having a support elevatable to take the weight of the forward part of said midsection, a second jack having a wheeled base and having a support elevatable to take the weight of the rearward part of said midsection, first connecting means extending forwardly from the first jack and firmly connectable to a front part of the tractor to ensure that the first jack stably rolls with the front wheels of the tractor, second connecting means extending rearwardly from the second jack and firmly connectable to a rear part of the tractor to ensure that the second jack stably rolls with the rear wheels of the tractor, the first and second jacks being independently adjustable to hold the forward and rearward parts of said midsection at exactly the same elevation ensuring perfect alignment of said forward and rearward parts, and means extending between the bases of the jacks and the supports to lock the supports in positions to which they have been elevated by the jacks.

2. Apparatus for supporting a tractor when split at its midsection between its front and rear wheels, comprising a first jack having a wheeled base and having a support elevatable to take the weight of the forward part of said midsection, a second jack having a wheeled base and having a support elevatable to take the weight of the rearward part of said midsection, first connecting means extending forwardly from the first jack and firmly connectable to a front part of the tractor to ensure that the first jack stably rolls with the front wheels of the tractor, and second connecting means extending rearwardly from the second jack and firmly connectable to a rear part of the tractor to ensure that the second jack stably rolls with the rear wheels of the tractor, the first and second jacks being independently adjustable to hold the forward and rearward parts of said midsection at exactly the same elevation ensuring perfect alignment of said forward and rearward parts, the base of each jack having wheels at either side of and forwardly and rearwardly of the vertical axis of the jack to stably support the jack, and the connecting means extending from the jack being connected to and transmitting forces to the base of the jack close to its wheel axes so as to impart little toppling moment to the jack.

3. Apparatus as claimed in claim 1, wherein the first connecting means comprises an arm extending forwardly from the wheeled base of the first jack to transmit forces close to the wheel axes of the base so as to exert little toppling moment to the first jack, and a yoke transverse to the arm and having uprights at opposite sides of the arm and connectable to transversely spaced apart points of said front part of the tractor.

4. Apparatus as claimed in claim 3, wherein the arm is hinged about a horizontal axis to the wheeled base of the first jack and is swingable in a vertical plane clear of the ground.

5. Apparatus as claimed in claim 4, wherein the position of the yoke along the arm is adjustable and the positions of the uprights along the yoke are adjustable.

6. Apparatus for supporting a tractor when split at its midsection between its front and rear wheels, comprising a first jack having a wheeled base and having a support elevatable to take the weight of the forward part of said midsection, a second jack having a wheeled base and having a support elevatable to take the weight of the rearward part of said midsection, first connecting means extending forwardly from the first jack and firmly connectable to a front part of the tractor to ensure that the first jack stably rolls with the front wheels of the tractor, and second connecting means extending rearwardly from the second jack and firmly connectable to a rear part of the tractor to ensure that the second jack stably rolls with the rear wheels of the tractor; the first connecting means comprising an arm extending forwardly from the wheeled base of the first jack so as to exert little toppling moment thereon, and a yoke transverse to the arm and having uprights at opposite sides of the arm and connectable to transversely spaced apart points of said front part of the tractor; the arm being hinged about a horizontal axis to the base of the first jack; the position of the yoke along the arm being adjustable and the positions of the uprights along the yoke being adjustable; the uprights being concave at their upper ends for engaging the tractor frame, and including flexible means that can be looped over the frame to fasten the uprights thereto.

7. Apparatus as claimed in claim 1, wherein the second connecting means comprises an arm hinged to and extending rearwardly from the wheeled base of the second jack to transmit forces close to the wheel axes of the base so as to exert little toppling moment to the second jack, the arm being swingable in a vertical plane clear of the ground, and a coupler extending upwardly from the arm and connectable to the tractor drawbar.

8. Apparatus for supporting a tractor when split at its midsection between its front and rear wheels, comprising a first jack having a wheeled base and having a support elevatable to take the weight of the forward part of said midsection, a second jack having a wheeled base and having a support elevatable to take the weight of the rearward part of said midsection, first connecting means extending forwardly from the first jack and firmly connectable to a front part of the tractor to ensure that the first jack stably rolls with the front wheels of the tractor, and second connecting means extending rearwardly from the second jack and firmly connectable to a rear part of the tractor to ensure that the second jack stably rolls with the rear wheels of the tractor; the second connecting means comprising an arm extending rearwardly from the base of the second jack so as to exert little toppling moment thereon, and a coupler extending upwardly from the arm and connectable to the tractor drawbar; the arm being hinged about a horizontal axis to the base of the second jack; the coupler comprising a stud hinged to the arm and a brace adjustable to fix the angle of the stud to the arm.

9. Apparatus as claimed in claim 7, wherein the position of the coupler along the arm is adjustable.

10. Apparatus as claimed in claim 1, wherein each support is adjustable in height relative to the jack in addition to being elevatable by the jack, each support comprising a generally horizontal plate substantially centered above the jack and adapted to contact the underside of and to receive the weight of one of said parts of the tractor midsection.

11. Apparatus for supporting a tractor when split at its midsection between its front and rear wheels, comprising a first jack having at least a tricycle-wheeled base with wheels located around the first jack and having a support elevatable to take the weight of the forward part of said midsection, a second jack having at least a tricycle-wheeled base with wheels located around the second jack and having a support elevatable to take the weight of the rearward part of said midsection, the supports being adjustable in height in addition to being elevatable by the jacks, a first arm hinged about a horizontal axis to the base of the first jack and extending forwardly from the first jack, a yoke transverse to the first arm and adjustable therealong, uprights on the yoke at opposite sides of the arm and adjustable along the yoke and connectable at their upper ends to the tractor between its front wheels, a second arm hinged about a horizontal axis to the base of the second jack and extending rearwardly from the second jack, and a coupler extending upwardly from the second arm, the position of the coupler along the second arm being adjustable and the coupler being connectable to the tractor drawbar, the jacks and their supports being independently adjustable to hold the forward and rearward parts of said midsection at exactly the same elevation ensuring perfect alignment of said forward and rearward parts.

12. Apparatus for supporting a tractor when split at its midsection between its front and rear wheels, comprising a first jack having a wheeled base and having a support elevatable to take the weight of the forward part of said midsection, a second jack having a wheeled base and having a support elevatable to take the weight of the rearward part of said midsection, first connecting means extending forwardly from the first jack and firmly connectable to a front part of the tractor to ensure that the first jack stably rolls with the front wheels of the tractor, second connecting means extending rearwardly from the second jack and firmly connectable to a rear part of the tractor to ensure that the second jack stably rolls with the rear wheels of the tractor, the first and second jacks being independently adjustable to hold the forward and rearward parts of said midsection at exactly the same elevation ensuring perfect alignment of said forward and rearward parts, each support being adjustable in height relative to the jack in addition to being elevatable by the jack, each support comprising a generally horizontal plate substantially centered above the jack and adapted to contact the underside of and to receive the weight of one of said parts of the tractor midsection, and guides extending between the bases of the jacks and the supports to restrain the supports including said plates against other than vertical movement.

* * * * *